SAKUJI HATTORI,
YOSHIKAZU TORIGOE and MITSURU IKEDA INVENTORS

SAKUJI HATTORI
YOSHIKAZU TORIGOE AND
MITSURU IKEDA
INVENTORS

United States Patent Office 3,527,741
Patented Sept. 8, 1970

3,527,741
PROCESS FOR THE RECOVERY OF RUBBERY POLYMERS
Sakuji Hattori, Yoshikazu Torigoe, and Mitsuru Ikeda, Yokkaichi-shi, Japan, assignors to Japan Synthetic Rubber Co., Ltd., Tokyo, Japan
Filed May 17, 1968, Ser. No. 730,112
Claims priority, application Japan, May 22, 1967, 42/32,220
Int. Cl. C08d 5/00; C08f 1/92, 1/96
U.S. Cl. 260—85.1                6 Claims

ABSTRACT OF THE DISCLOSURE

A process for recovering rubbery polymers by the steps of steam stripping a hydrocarbon solvent solution of the rubbery polymer using at least two strippers to remove the solvent and form an aqueous slurry of the polymer crumbs, separating water from the aqueous slurry and drying the remaining solid crumbs, the improvement residing in that the crumb concentration of the aqueous slurry in the second and subsequent strippers is increased by removing a part of water of the aqueous slurry.

---

This invention relates to an improvement in the process for recovering rubbery polymers from a hydrocarbon solvent solution of the rubbery polymer, in which the solvent is removed by steam stripping from the solution, and the polymer is recovered as an aqueous slurry.

More particularly, the invention relates to the process of recovering rubbery polymers comprising steam stripping a hydrocarbon solvent solution of the rubbery polymer with at least two strippers to remove the solvent therefrom, thereby forming an aqueous slurry of the polymer crumbs, separating water from the slurry and drying the resultant solid crumbs, the improvement residing in that a part of the water of the aqueous slurry is removed in order to increase the crumb concentration of the aqueous slurry in the second and subsequent stage strippers.

Recovery of rubbery polymers by the steps of removing the solvent from a hydrocarbon solvent solution of the rubbery polymer by steam stripping, thereby forming an aqueous slurry of the polymer crumbs, separating water from the slurry and drying the remaining crumbs, has been known. (For example, refer to Chemical and Engineering News, pages 50–51, Dec. 17, 1962.)

A conventional steam stripping process of a hydrocarbon solvent solution of a rubbery polymer obtained by solution polymerization (which is hereinafter referred to simply as polymer solution) will be briefly explained concerning a specific example. When the steam stripping is performed using three strippers equipped with powerful agitators, by supplying constantly regulated quantities of the polymer solution, hot water and steam to the first stripper, the hydrocarbon solvent is stripped and discharged with the steam from the upper portion of the stripper. The greatest part of the solvent is removed at the first stripper, and the rubbery polymer floats in the hot water as solid crumbs. The crumb slurry is pumped out and sent to the second stripper. The solvent remaining in the crumbs is further removed in the second stripper under the constant supply of predetermined quantity of steam, and the slurry is again pumped out and sent to the third stripper. Similarly, substantially the entire solvent remaining in the crumbs is removed in the third stripper, and the remaining crumb slurry is pumped out, to be sent to dehydration stage. The hot water separated from the crumbs is recycled to the first stripper. The crumbs still containing a considerable quantity of water is then forwarded to the next drying stage. The mixed vapor of water and the solvent discharged from upper portion of each stripper is combined and lead to a condenser to be liquefied. Then the water and solvent are separated in a separation tank. It is of course desirable that the solvent content of the crumbs recovered from the third stripper should be as low as possible. It is normally no more than 2%, and 1% or less in favorable cases.

The main factors affecting the solvent-removing effect of the steam stripping as above-described are quantity of the steam to be supplied, and residence time as well as form of the crumbs in the strippers. The norms for evaluation of the solvent-removing effect is the extent of solvent-removing per unit quantity of the steam used.

Hereinafter the three main factors influencing the solvent-removing effect will be briefly explained.

(1) Quantity of steam

Increase in steam supply normally causes higher rate of solvent-removing. However, we discovered that once the solvent content of the crumbs is reduced to a certain level, thereafter the quantity of steam has substantially no correlation with the rate of solvent-removing. Also from economical standpoint, use of the minimum necessary quantity of steam is desirable.

(2) Residence time of the crumbs in the strippers

Longer residence time increases the solvent-removing effect. This is probably due to the mechanism in that, after the residual solvent in the rubbery polymer grains (crumbs) is reduced to a certain level, the rate of solvent-removing is mainly determined by the rate of diffusion of the solvent on the surfaces of the polymer grains. As the conventional means to increase the residence time, strippers are given larger capacities, or the number of strippers is increased.

(3) Form of crumbs

Less grain or crumb size causes greater solvent-removing effect. Crumb diameters are determined by such factors as agitation power, effect of dispersing agents, concentration of the polymer solution employed, etc.

As the means to increase the residence time of the crumbs in the strippers, an alternative to the above-mentioned conventional practices will be to raise the ratio of the polymer grains to hot water in the strippers. (The ratio will be hereinafter referred to as crumb concentration.) To wit, if the quantity of hot water to be supplied to the first stripper is reduced, the crumb concentration increases, and in direct proportion thereto the residence time of the crumbs in each of the strippers is extended. However, when the crumb concentration exceeds a certain level, the continuously supplied polymer solution accumulates on the surfaces of the once formed solid crumb grains or particles. Thus the size of the grains increases, which cannot be reduced in the subsequent strippers. As the result the solvent-removing efficiency is lowered. Thus the crumb concentration in the first stripper is subject to inevitable limitations.

The object of the present invention is to resolve this difficult problem. Accordingly, the object of the invention is to provide a process for improving the solvent-removing efficiency by increasing the residence time of the crumbs, without increasing the capacity or number of strippers.

Other objects and advantages of the invention will become apparent from the following descriptions and attached drawings.

Figure 3:
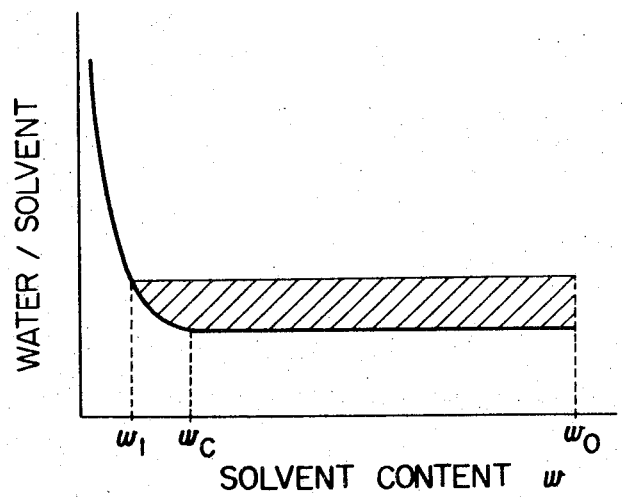

FIG. 3 generally shows the correlation between the composition of distilled overhead vapor and the quantity of residual hydrocarbon solvent in crumbs, in case of steam stripping a hydrocarbon solvent solution of rubbery polymers.

Figure 4:
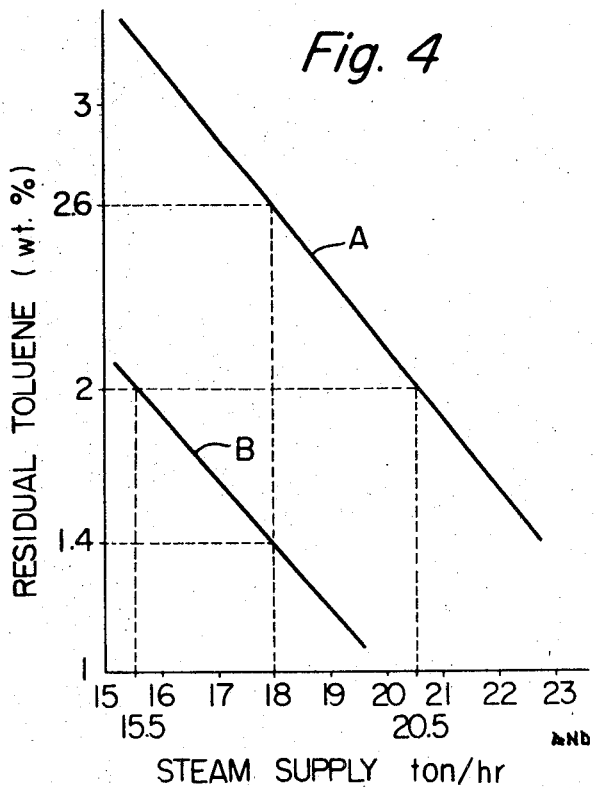

FIG. 4 is a graph showing the correlation between the total quantity of steam required and the quantity of the residual solvent in crumbs, as to a working example of this invention in which a toluene solution of cis-1,4-polybutadiene is steam stripped, and as to a control.

Figure 1A:
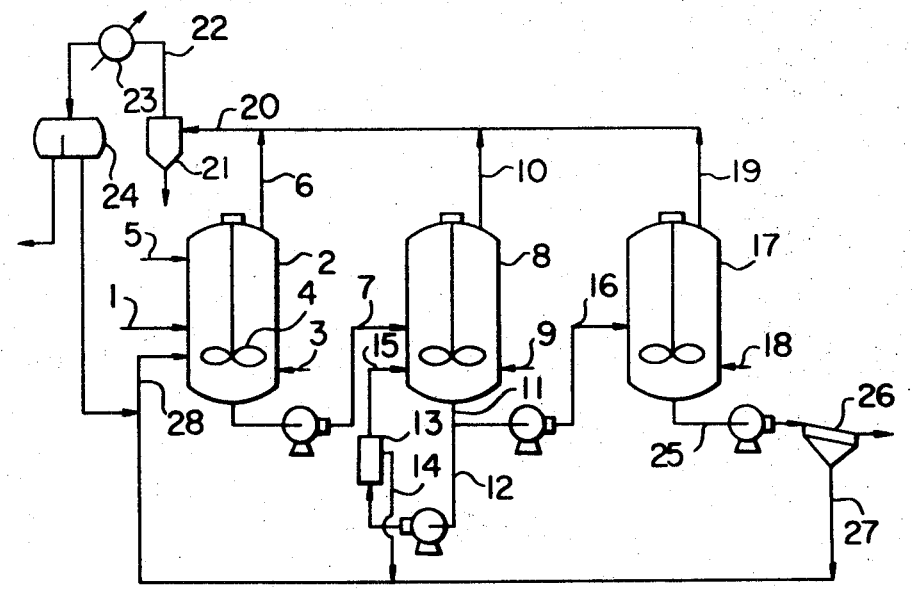
FIG. 1(a) is a flow sheet of a working example suited for practicing the subject process.

Hereinafter the invention will be explained with reference to the drawings. In FIG. 1(a), the polymer solution is supplied to the first stripper 2 from line 1, while steam is supplied from line 3. The stripper 2 is equipped with a stirrer 4. An aqueous solution of a suitable dispersing agent is introduced into the stripper 2 through line 5 attached to the upper portion of the stripper, in order to prevent the mutual adhesion of the granulated crumbs. The mixed vapor of the solvent and water is discharged through line 6 from the upper portion of the stripper 2. The greater part of the solvent is removed in this first stripper, and the resultant crumb slurry is sent to the second stripper 8 by means of a pump, through line 7. In the stripper 8, steam is supplied through line 9, and the mixed vapor of the solvent and water is discharged from the upper portion of the stripper through line 10. The crumb slurry is withdrawn through line 11, and a portion thereof is sent to a concentration 13 through line 12. At the concentrator 13, predetermined quantity of hot water is removed and withdrawn through line 14. Thus concentrated crumb slurry is returned to the stripper 8 through line 15. The remaining portion of the crumb slurry withdrawn through line 11 is introduced into the third stripper 17, through line 16. Into the stripper 17, steam is introduced from line 18, and the mixed vapor of the solvent and water is discharged through line 19. The mixed vapor discharged from the three strippers via lines 6, 10 and 19 is combined, and fed into a knock-out drum 21 through line 20. The mixed vapor leaving the drum is lead to a condenser 23 through line 22 and condensed. Then it is separated into the solvent phase and aqueous phase at a decanter 24. The crumb slurry withdrawn from the third stripper 17 is sent to a shaker screen 26 through line 25. By the shaker screen 26 the hot water is separated, and the remaining rubbery polymer crumbs are dried at the following drying stage (not shown). The hot water separated by the shaker screen 26 is sent through line 27 to be combined with the hot water separated at the concentrator 13 through line 14 and that separated at the decanter 24. Thus the combined hot water is recycled into the first stripper 2 through line 28.

Figure 1B:
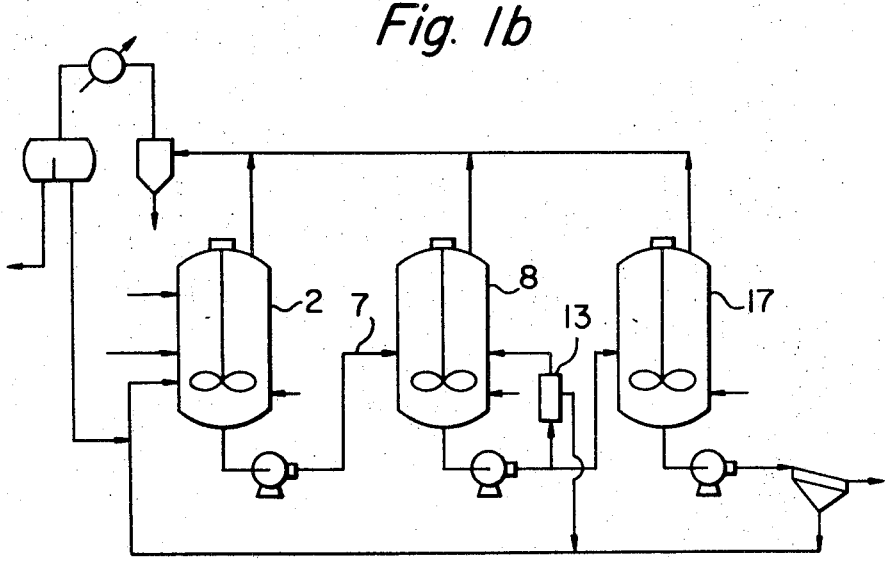
FIGS. 1(b) and (c) are the modifications of FIG. 1(a).

In the foregoing explanation of FIG. 1(a), the improvement of the invention resides in the feature of concentrating a portion of the crumb slurry withdrawn from the second stripper 8 with a concentrator 13, in order to increase the crumb concentration in the second and third strippers. The method of attaching the concentrator may be modified in various ways, for example, as illustrated in FIG. 1(b) or (c). Note however, if direct furnishing of the concentrator 13 in the line 7 for transporting the crumb slurry from the first stripper 2 to the second stripper 8 is intended as in the case of FIG. 1(c), since a perfect mixing is performed in the first stripper 2, the solvent content of individual crumb withdrawn therefrom varies over a wide range. There may be a case, therefore, that the crumb grains of relatively high solvent contents adhere to the filter face of the concentrator to clog it. Also when the flow quantity of the crumb slurry varies, the filter face of the concentrator as well as the line 7 from the concentrator 13 to the second stripper 8 may be clogged. It is also possible to attach concentrators to both second and third strippers to successively increase the crumb concentration. However, since it is normally permissible to raise the crumb concentration at the second stripper to the maximum extent allowable in the final stripper, only one concentrator provided in the second stripper is sufficient. Therefore, as a mode of practicing the invention, normally it is preferred to concentrate the crumb slurry taken out of the second stripper only once, and to return the concentrated slurry to the same stripper.

Figure 2A:
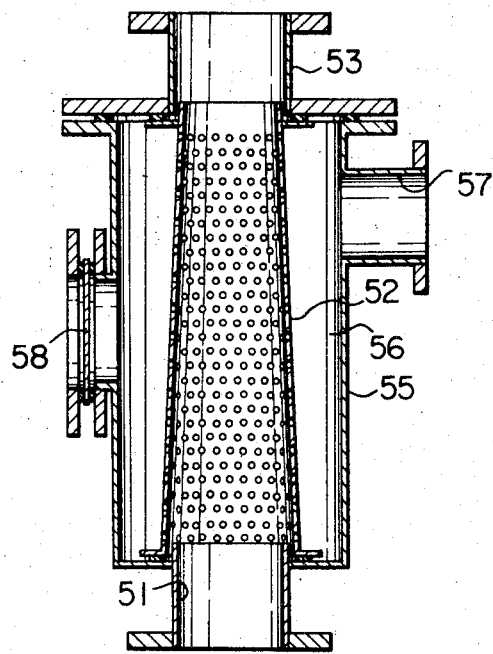
FIG. 2(a) shows cross-section of a concentrator which is suitable for the use in practicing the invention.
Figure 2B:
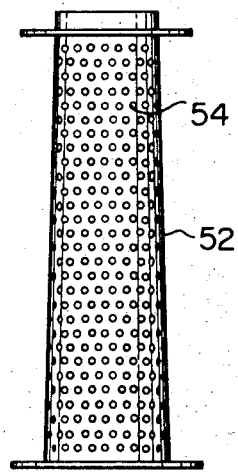
FIG. 2(b) is a side view of the inside pipe shown in FIG. 2(a).

Various concentration means for removing water from the crumb slurry may be proposed. For example, a filter-type concentrator as illustrated in FIG. 2 may be advantageously used. FIG. 2(a) shows cross-section of such a concentrator, in which the crumb slurry is introduced through a conduit 51, and withdrawn from a conduit 53 via an inside pipe 52. The short inside pipe 52 is provided with numerous perforations 54 of the size which will not pass the crumb grains. A part of the water in the crumb slurry passes through the perforations 54 and is discharged into the space 56 surrounded by exterior pipe 55, and hence discharged outside the apparatus through a conduit 57 attached to the exterior pipe 55. The pipe 55 is furthermore provided with a peep-hole 58. The crumb concentration of the slurry discharged from the conduit 53 can be controlled by adjusting the quantity of the water discharged through the conduit 57.

According to the process of the invention, it is possible to improve the solvent-removing effect by increasing the residence time of the crumbs in the strippers without increasing capacity or number of the strippers. The allowable crumb-concentration in the first stripper varies depending on such conditions as the specific type of rubbery polymers, molecular weight thereof, type of hydrocarbon solvents, stirring condition, etc., but is generally up to approximately 5–7 percent by weight. And, in the conventional practices the same crumb slurry concentration is maintained throughout the stripping to the final stripper stage. According to the invention, in contrast, the crumb concentration in the second and subsequent strippers can be raised to the order of 10–15 percent by weight. For example, if the crumb concentration is raised from 5% in the first stripper to 10% in the second and subsequent strippers (the perentages being by weight), the residence time of the slurry in the second and subsequent strippers is doubled. On the other hand, if the previous residence time is maintained, the capacity of the second and subsequent strippers may be reduced to the half.

The advantages of the invention may be explained from a different angle. It has been experimentally confirmed that the correlation between the composition of the distilled overhead vapor and the quantity of residual hydrocarbon solvent in the polymer crumb becomes generally as illustrated in the graph of FIG. 3. In the graph, the axis of ordinates ($W/S$) represents the weight ratio of water to hydrocarbon solvent in the distilled overhead vapor, and the axis of abscissae ($\omega$) represents the weight ratio of the residual hydrocarbon solvent to the rubbery polymer (solvent content of the polymer). Assuming that a steam stripping is performed in the first stripper until the initial solvent content of $\omega_0$ is reduced to $\omega_1$, the quantity of the distilled steam is $W/S \cdot (\omega_0 - \omega_1)$ per unit weight of the rubbery polymer. Therefore, the area in the graph filled with diagonal lines corresponds to the waste steam. In order to reduce the waste to the minimum, the solvent content of the crumbs withdrawn from the first stripper should be approached to a value ($\omega_0$) at which $W/S$ becomes constant to $\omega$. Accordingly, if in a given apparatus the crumb concentration is increased in accordance with the process of this invention the residence time of the crumbs in the second and subsequent strippers is increased, and correspondingly the solvent content of the crumbs withdrawn from the first stripper may be increased. To wit, according to the subject process, the steam consumption may be reduced. The reduction in the steam consumption according to the subject process is accomplished, due to such factors, besides the above-explained reason, as improved steam efficiency caused by the higher crumb concentration, as well as improved thermal efficiency because of the immediate recirculation of the hot water discharged from the concentrator to the first stripper.

Figure 1C:
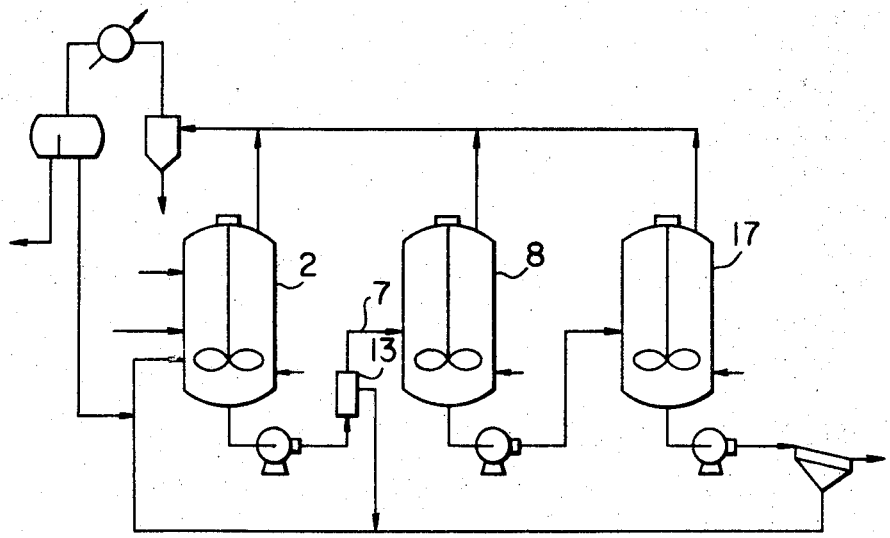

As described in the foregoing, the solvent content of the crumbs withdrawn from the first stripper can be increased according to the subject process, however with certain limitations incured by other considerations. That is, excessively high solvent content tends to cause clogging of conduits, pump and accessory control valve, etc. for transporting the crumb slurry from the first to the second stripper. Also if the concentrator is directly provided in the conduit as illustrated in FIG. 1(c), its filter orifices tend to be clogged. Considering these conditions, the normally allowable solvent content of the crumbs withdrawn from the first stripper ranges no more than 1, preferably 0.8 or less, although it varies somewhat depending on the type and molecular weight of the rubbery polymer, type of the solvent, etc. Whereas, excessively low solvent content causes increased steam consumption as already stated. Thus, the preferred solvent content of the crumbs withdrawn from the first stripper ranges, normally, approximately 0.1–0.8.

The subject process is particularly effective for steam stripping of a hydrocarbon solvent solution of cis-1,4-polybutadiene. The process is also applicable to hydrocarbon solvent solutions of other rubbery polymers such as, for example, cis-1,4-polyisoprene, styrene-butadiene rubber, ethylene-propylene rubber, etc. As the hydrocarbon solvents, aromatic hydrocarbons such as benzene, toluene and xylene; cycloaliphatic hydrocarbons such as cyclohexane and decalin; and saturated aliphatic hydrocarbons such as hexane, heptane, octane and nonane can be used.

Hereinafter an example is given for a more concrete explanation of the effect of the present invention.

EXAMPLE

Through a steam stripping of a toluene solution of cis-1,4-polybutadiene (polymer concentration: 13%) employing an apparatus as illustrated in FIG. 1(a), 2.8 tons per hour of polybutadiene was obtained. The stripping was performed at 90° C. and atmospheric pressure in all of the strippers. The polybutadiene employed was that obtained by polymerization of butadiene in toluene, with the reaction product of nickel naphthenate, boron trifluoride etherate and triethylaluminum as the catalyst. Its cis-1,4 content was 95.2% and Mooney viscosity was 46 $ML_{1+4}$ (100° C.).

The concentrator employed was a filter-type concentrator as illustrated in FIG. 2. The inside pipe in the concentrator was approximately 10 cm. in diameter and 40 cm. in length. The diameter of the filter orifices was 3 mm., and the pitch of the orifices was 6 mm.

The result is shown in the graph of FIG. 4 in which the axis of ordinates represents the weight percent of toluene remaining in the crumbs withdrawn from the third stripper and the axis of abscissae represents the total quantity of the steam required (ton/hour). The straight line A shows the result of control experiment in which the subject process was not employed. In the control, the crumb concentration in all of the strippers was 6% by weight, all other conditions being the same to those of the present example. The straight line B shows the result of the subject process, in which the crumb concentration in the first stripper was 6% by weight, and that in the second and third strippers was 10% by weight. The toluene content of the crumbs withdrawn from the first stripper was 0.10 in the control, and 0.15 in the present example.

From FIG. 4, it can be clearly understood that when 18 tons per hour of steam was used each in the control and present example, the quantity of toluene remaining in the crumbs withdrawn from the third stripper became, respectively, 2.6% and 1.4%. Furthermore, in order to make the quantity of the residual toluene 2%, approximately 20.5 tons per hour of steam was required in the control, while only 15.5 tons per hour was required in accordance with the subject process.

We claim:

1. A process for recovery of rubbery polymers selected from the group consisting of cis-1,4-polybutadiene, cis-1,4-polyisoprene, styrene-butadiene rubber and ethylene-propylene rubber which comprises the steps of steam stripping under agitation and in the presence of a dispersing agent, a hydrocarbon solution of said rubbery polymers, using at least two strippers to remove the solvent to thereby form an aqueous slurry of the polymer crumbs, separating water from the aqueous slurry and drying the remaining solid crumbs, wherein the crumb concentration of the aqueous slurry in the first stripper is maintained at 5 to 7 weight percent and in the second and subsequent strippers, at 10 to 15 percent by weight, the crumb concentration in the second and subsequent strippers being increased over that of the first stripper by removing part of the water of the aqueous slurry via a concentrator and maintaining the ratio of residual hydrocarbon solvent to said rubbery polymer in said first stripper at 0.1 part by weight solvent per part by weight rubbery polymer to 1 part by weight solvent per part rubbery polymer.

2. The process according to claim 1 wherein the ratio of residual hydrocarbon solvent to rubbery polymer in the first stripper is between 0.1 part by weight hydrocarbon solvent per part by weight rubbery polymer to 0.8 part by weight hydrocarbon solvent per part by weight rubbery polymer.

3. The process according to claim 1 wherein hot water is discharged from the concentrator to the first stripper.

4. The process according to claim 1 wherein the rubbery polymer is cis-1,4-polybutadiene.

5. The process according to claim 4 wherein the hydrocarbon solvent is toluene.

6. The process according to claim 1 wherein a filter concentrator is employed.

References Cited

UNITED STATES PATENTS 3,250,313   5/1966   Irvin _____ 260—94.7 XR
3,437,645   4/1969   Paige et al. _____ 260—94.7 XR JOSEPH L. SCHOFER, Primary Examiner W. F. HAMROCK, Assistant Examiner U.S. Cl. X.R.

260—80.78, 88.2, 94.7, 96